United States Patent Office 2,807,602
Patented Sept. 24, 1957

2,807,602
DENTAL MATERIALS CONTAINING BUTADIENE COPOLYMERS

Hermann Schnell, Leverkusen-Wiesdorf, and Wilhelm Becker, Leverkusen-Bayerwerk, Germany, assignors to Farbenfabriken Bayer, Leverkusen, Germany No Drawing. Application August 12, 1952, Serial No. 304,007

Claims priority, application Germany August 17, 1951

9 Claims. (Cl. 260—45.5)

The invention relates to molding compositions, more particularly it relates to products of restorative dentistry, for instance dental protheses and dental fillings; furthermore, the invention relates to processes of preparing such products.

It has been proposed to prepare molding compositions, especially dental material, for example for dental protheses and dental fillings, by producing moldable plastic mixtures of polymers of a specific composition and monomeric, polymerizable, liquid compounds with the addition of other substances, for example pigments and filling materials, in the presence of polymerization catalysts, and converting said mixtures after molding into a solid product by polymerizing the monomer under slight pressure, if necessary at elevated temperatures. Various polymers have been employed in the aforesaid process. The suitability of the polymers depends upon their capability of dissolving or swelling in the monomers employed. The mechanical properties of molded articles prepared from these polymers, however, do not meet all the practical requirements in many fields of application.

The object of the present invention is to provide molding compositions, especially products of restorative dentistry, for example dental protheses and dental fillings, of particularly good mechanical properties.

Another object of the invention is to provide a process of producing such molding compositions.

Other objects of the invention will become apparent as the following description proceeds.

The objects of the invention are accomplished by employing in the above described prior art process copolymers containing no more than 40 percent by weight and preferably no less than 5 percent by weight of butadienes as polymerization component. Suitable polymerization components for preparing said copolymers embrace all the compounds containing polymerizable olefinic bonds which are capable of yielding copolymers with the butadienes employed.

Especially useful polymerizable compounds are acrylates and methacrylates among which the methacrylates the alcohol radical of which having less than four carbon atoms, especially the methyl metcrylate, are of particular interest. Furthermore it is possible to employ according to the invention mixtures containing various polymerizable compounds, for instance acrylonitrile or methacrylonitrile, in order to improve, for instance, the hardness of the copolymer or its solubility. It is preferable to use mixtures which contain said various polymerizable compounds in quantities not exceeding the amount of acrylates or methacrylates. Further may be mentioned compounds containing more than one polymerizable olefinic bond known as cross-linking agents, for instance divinyl benzene or the acrylates and methacrylates of polyhydric alcohols such as ethyleneglycoldimethacrylate and hexanediol diacrylate. Said compounds containing at least two polymerizable double bonds shall preferably be employed in quantities not exceeding 10 percent by weight calculated on the total mixture. The term "butadienes" as used herein is intended to include 1.3-butadiene and its derivatives such as 2-methyl- and 2.3-dimethyl butadiene, furthermore the halogenated butadienes such as 2-chloro butadiene. The amount of butadienes to be employed according to the invention depends upon the desired effect, however, no more than 40 percent of butadienes are to be used since otherwise the hardness and temperature stability required for dental protheses is affected.

Copolymerization of the butadienes and other polymerizable compounds may be effected in most various manners, for instance by the block, pearl, solvent or emulsion polymerization process. The polymerization process may be activated and controlled by conventional methods. It is of advantage to isolate the copolymers in the presence of antioxidants in order to preserve the solubility of the copolymers or their capability of swelling in the monomers applied. Antioxidants which may be utilized in the practice of the invention are for instance phenyl-β-naphthyl amine, methylene-bis-(2-hydroxy-3-isobutyl-5-methyl benzene), 1-hydroxy-2.5-diisobutyl-4-methyl benzene, and methylene-bis-(2-hydroxy-3-cyclohexyl-5-benzene).

Examples of liquid polymerizable compounds dissolving or swelling the above named copolymers are acrylates and methacrylates, particularly methyl methacrylate. Further suitable liquid polymerizable compounds are those containing in the molecule more than one polymerizable double bond, for instance ethylene glycol dimethacrylate, trimethylol propane dimethacrylate and divinyl benzene. The said compounds acting as cross-linking agents are preferably employed in mixture with the aforesaid compounds containing only one double bond, which often leads to a substantial improvement in the physical properties, especially the impact strength of the final products.

The aforedescribed mixtures of polymerizable compounds and the copolymers dissolving or swelling in these polymerizable compounds may be blended prior to molding with the usual addition products such as dyestuffs, pigments and fibrous materials. Furthermore, it is possible to partly replace in said mixtures the copolymers to be employed according to the invention by high molecular weight compounds commonly used in this field.

It could not be foreseen that the copolymers containing butadienes are suitable in the process of the invention since butadiene copolymers are known to be difficultly soluble and resistant to swelling.

The molding compositions obtained in the herein described process are distinguished by surprisingly good mechanical properties, for instance as to the bending stress durability, which is of particular importance for the production of dental protheses.

The following examples shall serve to illustrate the invention but are not intended to limit same; the parts being by weight if not otherwise stated:

Example 1

840 parts of methyl methacrylate and 160 parts of butadiene are emulsified in 3000 parts by volume of water containing 50 parts of a paraffin sulfonate as emulsifier, and polymerized after addition of 5 parts of the sodium salt of sulfinic acid of straight-chain paraffin hydrocarbons containing 10–12 carbon atoms (see French Patent 900,164) and 20 parts by volume of 1/n sulfuric acid at 40° C. for 16 hours. The latex obtained is precipitated by stirring same into acetone containing 3 grams of dissolved 1-hydroxy-2.5-diisobutyl-4-methyl benzene for preventing oxidation. After isolation the copolymer obtained is liberated from the emulsifier by washing in the centrifuge and dried at 45° C. 920 parts of a finely pulverized copolymer containing 26.0 percent of oxygen are obtained. The dry product is made into a sheet on the cold roller and the sheet is ground in the toothed disk mill to a particle size of 0.5–1 mm.

12.5 parts of the copolymer thus pulverized are intimately mixed with 5 parts by volume of methyl methacrylate containing 0.2 part of benzoyl peroxide; a plastic, doughy mass is obtained on kneading within some minutes. The monomeric/polymeric paste is heated in a closed mold to 70° C. for ½ hour and subsequently to 100° C. for 1 hour. A clear, transparent, colorless, plastic showing the following properties is obtained:

| | |
|---|---:|
| Impact strength _____kg./cm.² __ | 27 |
| Bending strength _____kg./cm.² __ | 687 |
| Bending angle _____degrees __ | 65 |
| Brinell hardness after 10" _____ | 825 |
| Break after reversed bendings _____ | 140,000 |

All the above properties were determined with 2 mm. thick test plates. The reversed bending number was measured by continuous deformation of a 6 cm. long and 1 cm. broad test piece by ±1.25 mm. Control pieces prepared from polymethyl methacrylate and methyl methacrylate according to the same process under comparable conditions showed the following properties:

| | |
|---|---:|
| Impact strength _____kg./cm.² __ | 14 |
| Bending strength _____kg./cm.² __ | 915 |
| Bending angle _____degrees __ | 14 |
| Brinell hardness after 10" _____ | 1,090 |
| Break after reversed bendings _____ | 16,000 |

*Example 2*

12.5 parts of a powdery copolymer prepared, as described in Example 1, from 830 parts of methyl methacrylate and 170 parts of butadiene and containing 25.5 percent of oxygen are made into a paste with 5 parts by volume of a mixture of 4.5 parts by volume of methyl methacrylate and 0.5 part by volume of ethylene glycol dimethacrylate containing 0.2 part of dissolved benzoyl peroxide; the plastic paste thus obtained is polymerized in a mold under pressure at 70° C. for ½ hour and subsequently at 100° C. for 1 hour. A clear, transparent, colorless, tough plastic showing the following properties is obtained:

| | |
|---|---:|
| Impact strength _____kg./cm.² __ | 45 |
| Bending strength _____kg./cm.² __ | 687 |
| Bending angle _____degrees __ | 65 |
| Brinell hardness after 10" _____ | 815 |
| Break after reversed bendings _____ | 175,000 |

A plastic prepared in the same manner in which 5 parts by volume of methyl methacrylate containing 0.1 part of dissolved benzoyl peroxide were employed for pasting up shows the following properties:

| | |
|---|---:|
| Impact strength _____kg./cm.² __ | 35 |
| Bending strength _____kg./cm.² __ | 768 |
| Bending angle _____degrees __ | 65 |
| Brinell hardness after 10" _____ | 830 |
| Break after reversed bendings _____ | 150,000 |

*Example 3*

750 parts of methyl methacrylate and 250 parts of butadiene are copolymerized as described in Example 1; the latex obtained is mixed with the latex prepared by emulsion polymerization of methyl methacrylate, which contains the same quantity of solid substances, in the proportion of 1:1. By stirring the combined latices into acetone containing methylene-bis-(2-hydroxy-3-cyclohexyl-5-methyl benzene) the polymer is isolated, washed with water in the centrifuge and dried at 45° C. The finely pulverized polymeric mixture obtained is made into a sheet on the cold roller. The sheet is ground in the toothed disk mill to a particle size of about 0.5 mm. 12.5 parts of the pulverized polymer are wetted with 5 parts by volume of methyl methacrylate containing 0.2 part of benzoyl peroxide. After some minutes a doughy, kneadable mass is formed; the mass is polymerized in a mold at 70° C. for ½ hour and subsequently at 100° C. for 1 hour. A clear, transparent, tough plastic of good strength properties is obtained. The following properties were determined with 2 mm. thick test plates:

| | |
|---|---:|
| Impact strength _____kg./cm.² __ | 47 |
| Bending strength _____kg./cm.² __ | 806 |
| Bending angle _____degrees __ | 49 |
| Brinell hardness after 10" _____ | 847 |
| Break after reversed bendings _____ | 300,000 |

We claim:
1. Dental materials for making dental restorations comprising a polymerizable liquid organic compound (I) having an olefinic bond and a finely pulverized solid copolymer (II) of a compound selected from the group consisting of acrylic acid alkyl esters and methacrylic acid alkyl esters and 5–40% by weight of a polymerizable butadiene, said copolymer II being present in an amount surpassing that of said liquid polymerizable compound (I).

2. Dental materials according to claim 1, wherein the polymerizable liquid organic compound (I) is a compound selected from the group consisting of acrylic acid alkyl esters and methacrylic acid esters of monohydric alcohols.

3. Dental material according to claim 2, wherein the polymerizable liquid organic compound (I) is methacrylic acid methyl ester.

4. Dental material according to claim 1, wherein the polymerizable liquid organic compound (I) consists of a mixture of a compound having a polymerizable olefinic bond and a compound containing at least two polymerizable olefinic bonds.

5. Dental material according to claim 1, wherein the copolymer (II) is produced from methacrylic acid methyl ester and 5–40% by weight of a polymerizable butadiene.

6. Dental material according to claim 1, wherein the copolymer (II) is produced from an ethylenic compound selected from the group consisting of acrylic acid alkyl esters and methacrylic acid alkyl esters, 5–40% by weight of a polymerizable butadiene, and a further polymerizable ethylenic compound.

7. Dental material according to claim 6, wherein said further polymerizable compound is a compound of the formula

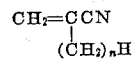

wherein $n$ is an integer from 0 to 1, both inclusive.

8. Dental material according to claim 6, wherein said further polymerizable compound is a compound containing at least two polymerizable ethylenic bonds.

9. Dental material for making dental restoration comprising methacrylic acid methyl ester and a finely pulverized copolymer of 5–40% by weight of butadiene and 95–60% by weight of methacrylic acid methyl ester.

References Cited in the file of this patent

UNITED STATES PATENTS

| 2,569,767 | Knock _____ | Oct. 2, 1951 |
| 2,572,959 | Sparks et al. _____ | Oct. 30, 1951 |
| 2,609,353 | Rubens et al. _____ | Sept. 2, 1952 |

FOREIGN PATENTS

| 888,775 | France _____ | Sept. 13, 1943 |